United States Patent [19]

Werlberger et al.

[11] Patent Number: 4,643,022
[45] Date of Patent: Feb. 17, 1987

[54] DEVICE FOR OBSERVING THE PROCESSES TAKING PLACE IN THE COMBUSTION CHAMBER OF AN INTERNAL COMBUSTION ENGINE DURING OPERATION

[75] Inventors: Peter Werlberger; Irolt Killmann; Wolfgang Cartellieri, all of Graz, Austria

[73] Assignee: AVL Gesellschaft für Verbrennungskraftmaschinen und Messtechnik mbH, Graz, Austria

[21] Appl. No.: 617,803

[22] Filed: Jun. 6, 1984

[30] Foreign Application Priority Data

Jun. 8, 1983 [AT] Austria .................................. 2097/83

[51] Int. Cl.⁴ .......................................... G01M 15/00
[52] U.S. Cl. ................................................ 73/117.3
[58] Field of Search ................. 73/119 R, 119 A, 116, 73/117.3, 35; 356/43, 44, 241; 350/96.26, 96.22, 96.25, 96.24

[56] References Cited

U.S. PATENT DOCUMENTS

| | | | |
|---|---|---|---|
| 3,809,072 | 5/1974 | Ersek et al. | 350/96.26 |
| 4,011,017 | 3/1977 | Feuerstein et al. | 350/96.26 |
| 4,274,704 | 6/1981 | Zobel | 356/241 |
| 4,277,168 | 7/1981 | Oku | 350/96.26 |
| 4,326,798 | 4/1982 | Kahn | 356/43 |
| 4,354,105 | 10/1982 | Spirig | 356/43 |
| 4,404,841 | 9/1983 | Franke et al. | 73/116 |
| 4,408,827 | 10/1983 | Guthrie et al. | 356/43 |
| 4,409,815 | 10/1983 | Burkel et al. | 73/116 |
| 4,422,323 | 12/1983 | Linder et al. | 73/35 |
| 4,484,469 | 11/1984 | Grover et al. | 73/119 A |

FOREIGN PATENT DOCUMENTS

| | | | |
|---|---|---|---|
| 0062612 | 4/1983 | Japan | 350/96.26 |
| 0817504 | 4/1981 | U.S.S.R. | 73/119 A |

OTHER PUBLICATIONS

Arthur W. Judge, *The Testing of High Speed Internal Combustion Engines*, 1955, pp. 460-464, London.

Primary Examiner—Jerry W. Myracle
Assistant Examiner—Robert R. Raevis
Attorney, Agent, or Firm—Watson, Cole, Grindle & Watson

[57] ABSTRACT

In order to observe and optically record the processes in the combustion chamber of an internal combustion engine during operation, at least one observation bore located in the wall of the combustion chamber is provided with a transparent window as well as an image pickup device, e.g. an endoscope, which may be inserted as far as to this window and is connected to an image recording unit by way of an image transmission device. In order to prevent the premature build-up of sooty deposits the window may be separated from the adjacent, cooled parts of the wall of the combustion chamber by a gap which will reduce the dissipation of heat.

7 Claims, 7 Drawing Figures

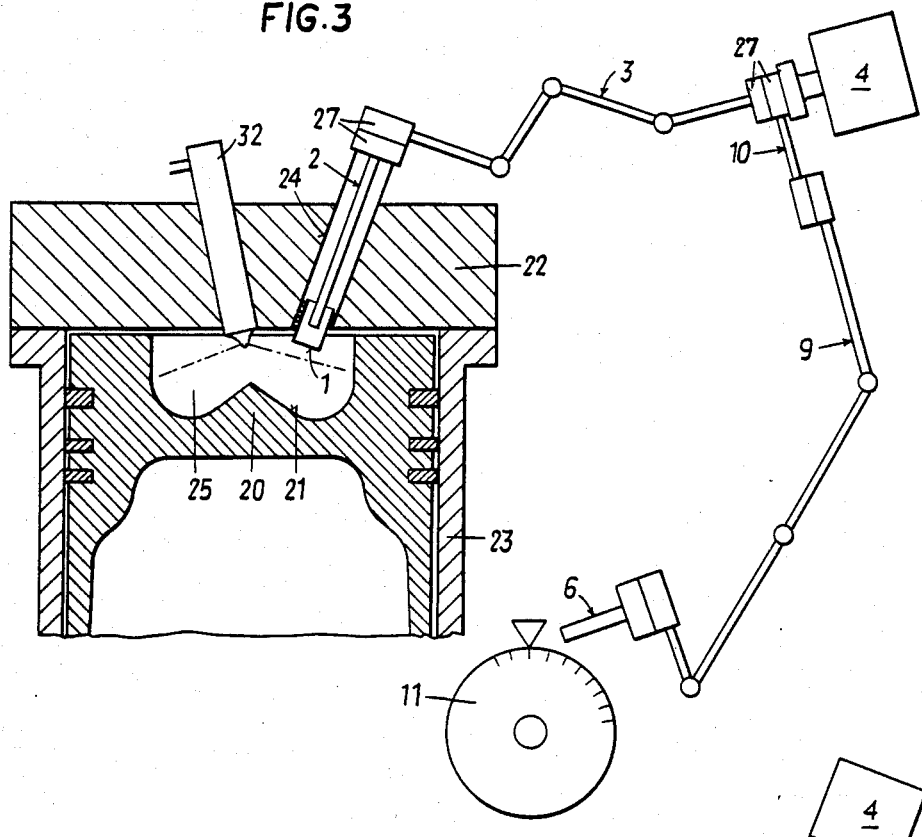
FIG.3
FIG.4
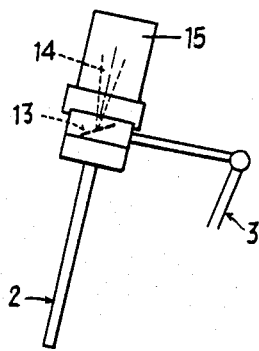
FIG.5
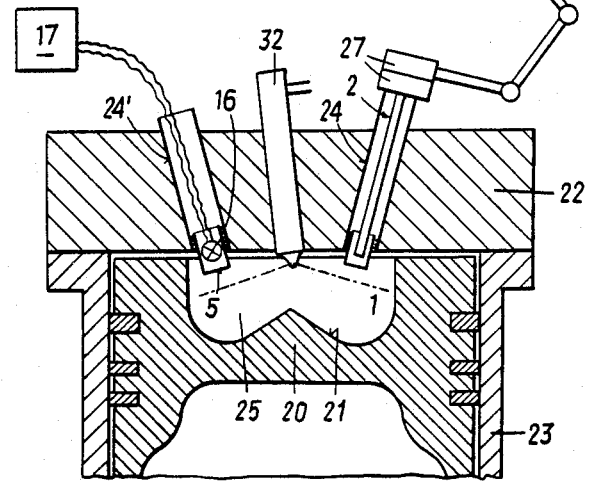

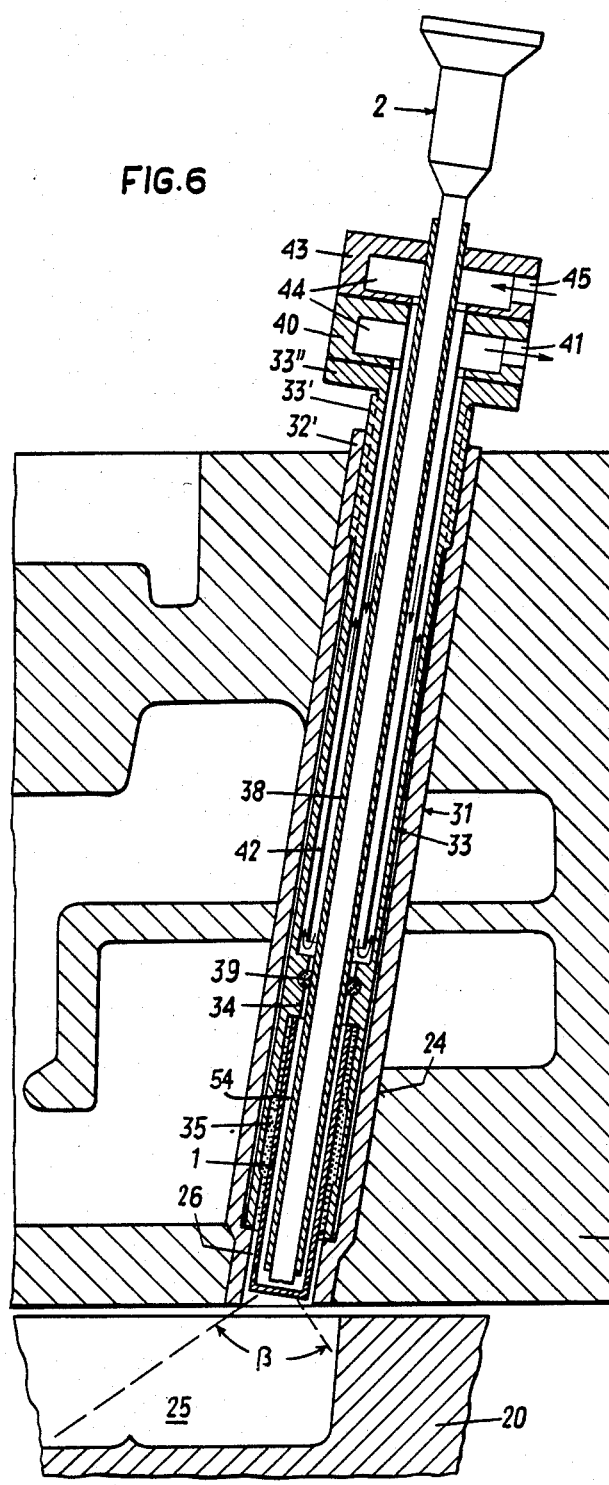
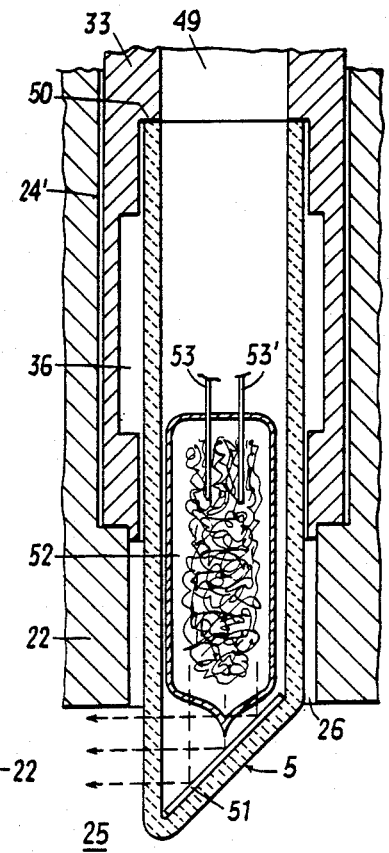
FIG.6
FIG.7

DEVICE FOR OBSERVING THE PROCESSES TAKING PLACE IN THE COMBUSTION CHAMBER OF AN INTERNAL COMBUSTION ENGINE DURING OPERATION

BACKGROUND OF THE INVENTION

1. Field of the Invention

This invention relates to a device for observing the processes taking place in the combustion chamber of an internal combustion engine during operation through one or more observation openings or bores located in a wall of the combustion chamber.

2. Description of the Prior Art

In order to enable combustion processes in the combustion chamber of an internal combustion engine to be photographed with cameras for high-speed cinematography, various types of engines have already been built with this aim in mind. The addition of the high-speed cinematography equipment necessitated a number of modifications in these engines, however, as compared with the commercially available engines, causing drastic changes of essential engine parameters, e.g., flow characteristics, thermodynamic state, geometry of the combustion chamber, etc.

For example, a diesel engine was provided with a cover of quartz or plexiglass through which the combustion chamber was filmed during the process of combustion with the use of a mirror. As the transparent cylinder head would not permit the addition of valves, a port control system had to be used, which resulted in completely different flow conditions in the combustion chamber as compared with valve-controlled engines.

In another variant of such an observation device a piston with a transparent head was used through which the combustion process may be filmed via mirrors projecting into open slits in the piston jacket. Since the mirrors had to remain clean, the use of an oil-lubricating system was prohibited. For sealing purposes teflon rings had to be used, allowing only speeds of up to 1,500 revolutions per minute.

In both of these known variants the soiled transparent components had to be cleaned after as few as 10–20 working cycles.

SUMMARY OF THE INVENTION

It is the object of the present invention to build a device of simple design for optical observation of the interior of the combustion chamber and optical recording of the processes observed, without seriously influencing these processes.

According to the invention this is achieved in a device of the above type by inserting a transparent window into the observation bore, or each of the observation bores, and by providing an optical pickup device, e.g., an endoscope, preferably of a rigid design, for optical image formation and recording of the processes, which device may be introduced or inserted into the observation bore or bores as far as to the above window, and which is connected to an image recording unit, e.g., a high-speed camera, by means of an image transmission device, preferably of an articulated or flexible kind, e.g., an articulated system of optical fibres. In this manner the processes taking place in the interior of the combustion chamber (valve movement, injection, combustion, etc.) can be observed and optically recorded most accurately, without actually interferring with them. The measuring device may be attached on the outside of the internal combustion engine and may be replaced easily. Through the small opening of the combustion chamber (with a diameter of approximately 9 mm) endoscopes may be introduced, for example, carrying lenses permitting a three-dimensional view from the wall of the combustion chamber, with a wide aperture angle. The processes in the combustion chamber may thus be recorded optically without necessitating any modifications of the internal combustion engine.

In a preferred form of the invention a second optical pickup device, e.g., another endoscope, is added for improved imaging, especially for the simultaneous observation of processes, such as combustion, from two different viewing angles, which endoscope is located in another observation bore, and which is connected to the image recording unit via another image transmission device, e.g., articulated optical fibres, and via a beam splitter or coupler. In order to prevent the optical pickup devices inserted from being soiled by sooty deposits, and to seal each observation bore, the invention provides that the transparent window inserted into the observation bore(s) should have a gap in the area adjacent to the combustion chamber, which will prevent the dissipation of heat from the window by separating it from the adjacent parts of the wall of the combustion chamber or cylinder head, which are cooled at least in an indirect manner.

DESCRIPTION OF THE DRAWINGS

Further characteristics and special advantages of the invention are described below, by means of the examples presented in the enclosed drawings, in which FIGS. 2 and 3 present variants of the device according to the invention, FIG. 4 shows a section of a free end of an endoscope, FIG. 5 shows a device according to the invention, including a lighting unit, FIG. 6 presents an endoscope inserted into a window, and FIG. 7 a lighting unit, e.g. as included in FIG. 5.

DETAILED DESCRIPTION OF THE PREFERRED EMBODIMENTS

Figure 1:
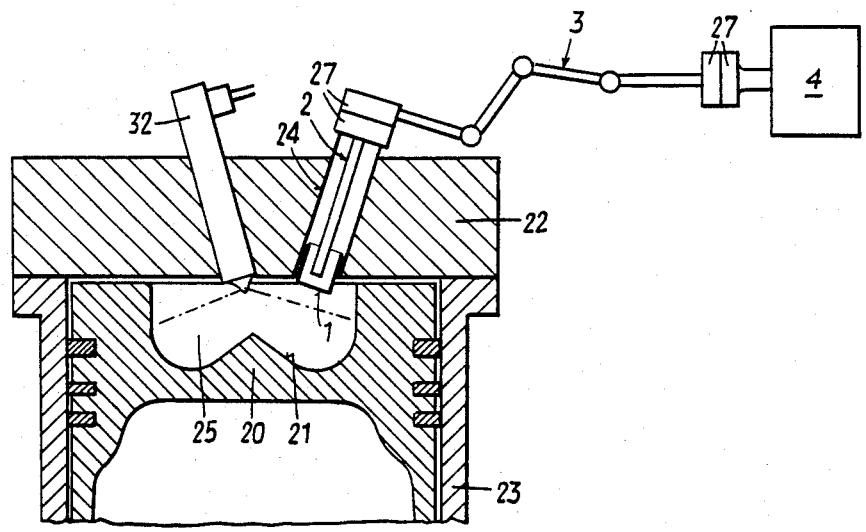
FIG. 1 shows the basic principle of a device according to the invention.
Figure 2:
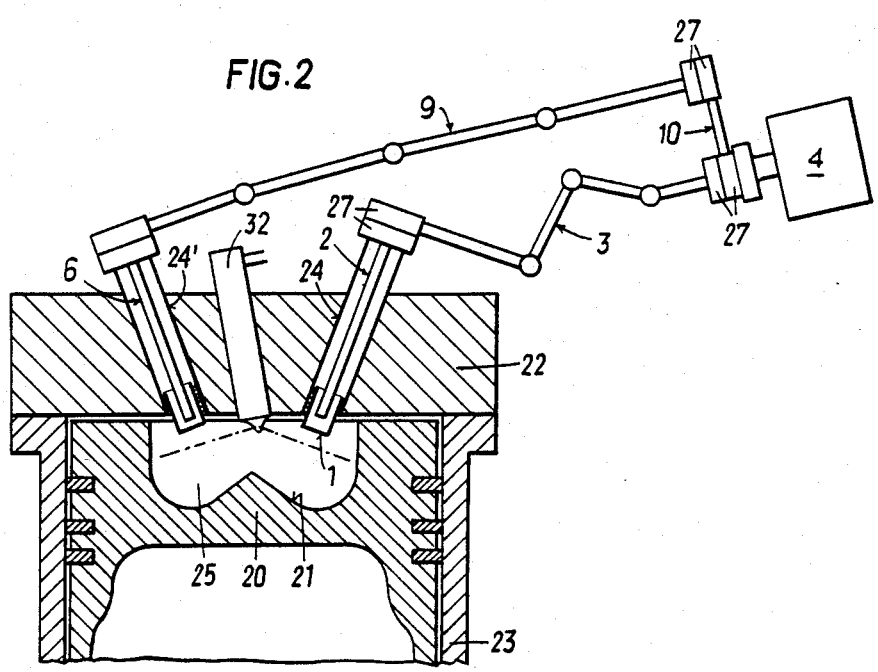

FIG. 1 is a schematical view of a piston 20 with a combustion space 21, in a cylinder 23, the respective cylinder head 22 being provided with an injection nozzle 32. The cylinder head 22 further contains a bore 24 which is sealed at its mouth which communicates with the combustion chamber 25 by a transparent window 1, e.g. made of quartz glass. Bore 24 contains an optical pickup device reaching into the cup-shaped window 1, or rather, an endoscope 2, preferably of a rigid design, carrying an optical pickup device on its end, such that the combustion chamber 25 may be observed and optically captured through the window 1. By way of an articulated image transmission unit 3, for instance made of coupled optical fibres, the endoscope 2 is connected to an image recording unit 4, e.g., a camera, in particular, a high-speed camera. FIG. 2 shows a set-up in which another endoscope 6 is introduced into another bore 24' provided with a window 5, e.g., for the simultaneous recording of the ignition process from two sides. The second endoscope 6 is connected to camera 4 via another articulated image transmission unit 9 and a beam splitter or coupler 10, which will enable the processes observed via the endoscopes 2, 6 to be recorded simultaneously.

The articulated optical systems 3, 9 are useful for preventing the vibrations of the engine from being transmitted on to the image recording unit 4. A rigid connection would impede the handling and replacement of the endoscopes. The articulated optical fibres and endoscopes and image recording units may easily be connected to one another by means of coupling members 27.

FIG. 3 shows a set-up in which the image of a marker disk 11 representing the crankshaft angle is projected onto the image recording unit 4 via the second endoscope 6, the articulated optical fibres 9 and a beam coupler 10, in order to be able to assign the corresponding positions of the crankshaft to the observed processes in the combustion chamber. Disk 11 may be attached to a suitable engine shaft.

FIG. 4 is a schematical view of the exterior end of an endoscope 2 provided with a semi-transparent mirror 13, such that a part 14 of the image or light picked up by the endoscope 2 may be diverted, or rather, such that it will not enter the articulated optical fibres 3 but may be fed into an evaluation unit 15 for further uses, for instance temperature measurements.

FIG. 5 shows a set-up in which a lighting unit 16, possibly a stroboscope, is located in bore 24', behind the window 5, which unit is pulsed by a control unit 17, thus permitting the recording even of processes that are not light-generating in themselves, such as the injection process.

It should be noted that more than two recording or lighting units may be provided.

FIGS. 6 and 7 present special variants of an endoscope or a lighting unit.

According to FIG. 6 an adapter sleeve 31 is inserted in bore 24 of the cylinder head 22 of the internal combustion engine under observation. The upper end of this sleeve has a section 32' with an internal thread receiving a thread section 33' of an insert sleeve 33. At a distance from the bottom end of the insert sleeve 33 of approximately a quarter of the total sleeve length, the bore of the insert sleeve 33 has a bottleneck 34. The cup-shaped window 1 made of quartz glass rests against the lower side of this bottleneck 34. Window 1 is a small cylindrical tube whose end which faces the combustion chamber 25 is sealed by a flat bottom normal to the tube axis, which may also be designed as an integral part of the tube. Window 1 is held in place in the insert sleeve 33 by means of an adhesive 35.

The outer diameter of the window tube 1 is less than the inner diameter of the bore 24 at its mouth 24; and indeed is less than the inner diameter of the adapter sleeve 31 at the mouth 24; thus leaving an annular gap 26 therebetween.

Into this insert sleeve 33 the endoscope 2 is inserted. The endoscope 2 is surrounded by a support sleeve 38 along its entire length within which it may be adjusted and shifted up and down either manually or by a drive motor. In this way it will be possible to move the endoscope 2 towards the bottom of window 1 during the period of observation and recording only.

The support sleeve 38 is held in the bottleneck 34 by means of an O-ring 39 in the insert sleeve 33. Relative to the window 1, however, the support sleeve 38 and the endoscope 2 may move freely. On top of flange 33" which is located at the upper end of the insert sleeve 33 projecting from the cylinder head 22, a housing 40 is positioned containing a cylindrical chamber 44 into which is opening a radial outlet channel 41. Top and bottom of the housing 40 each have a central bore, the one in the top being smaller than the one in the bottom. In the bore in the top of the housing 40 a sheet metal cylinder 42 is inserted which extends into the insert sleeve 33 almost as far as to the bottleneck 34. On top of the housing 40 there is placed another housing 43 with a central bore in its bottom of a diameter corresponding to the inside diameter of the sheet metal cylinder 42. This housing 43 again has a cylindrical chamber 44 into which is opening a radial feed channel 45. The two channels 41 and 45 are connected to a coolant circulation system (not shown). As a coolant water may be used, for instance. Since the insert sleeve 33 is only screw-fastened in the adapter sleeve 31 the device may be mounted or removed easily. Besides, as there is no contact between the window 1, which is made of quartz glass whose thermal conductivity is rather poor, and the support sleeve 38, or rather, the endoscope 2, and as the window is separated by an annular gap from the adapter sleeve 31, it is heated by the hot combustion gases to such an extent as to prevent the build-up of sooty deposits at the window. The angle describing the field of vision is denoted $\beta$.

In order to protect the endoscope 2 effectively against excessive heating the coolant, e.g., water, is fed into the housing 43 through channel 45. The coolant will flow on the inside of the sheet metal cylinder 42 as far as the bottleneck 34, amply cooling the support sleeve 38 of the endoscope 2. At the bottleneck 34 the coolant flow is reversed such that it will flow upwards into the lower housing 40, leaving it by the outlet channel 41. This kind of cooling system will permit additional optical fibres used for lighting purposes to be placed into insert sleeve 33. The support sleeve 38 may be made of copper or some other material with good heat-conducting properties. Since the endoscope 2 is cooled from outside there will be an external dissipation of heat.

The device for lighting the combustion chamber presented in FIG. 7 is of a similar design. Again, the insert sleeve 33 is directly mounted in a bore 24' of the cylinder head 22. The bore 49 of the insert sleeve 33 has a step 50 against which is resting the window 5 which consists of a cylindrical tube and a flat bottom which in this case is inclined against the tube axis, however. The cylinder head 22 and the tube are separated by gap 26. The window 5 is fastened to the insert sleeve 33 by means of an adhesive 36 which is placed in an annular recess within the insert sleeve 33. Again, quartz glass may be used for the window 5. On the inside of the bottom surface which is inclined against the tube axis, there is a metal mirror 51 deflecting the light rays running parallel to the axis of bore 24' by 90 degrees into the interior of the combustion chamber 25. These light rays are emitted by a flash bulb 52 which is located inside the window 5, at a small given distance from the inside of the tube wall and from the metal mirror 51. The current leads for the flash bulb 52 have the numbers 53 and 53'.

It would also be possible to do without the metal mirror and to use a solid glass cylinder as a window, whose bottom is inclined relative to the cylinder axis, instead of the above type of window, i.e., a cylindrical tube whose bottom is inclined relative to the tube axis. In the case of the solid glass cylinder the angle of inclination must be larger than the critical angle for total reflection.

It will depend on the mode of observation, angle of vision, etc., to what length the endoscope(s) is (are) introduced into the combustion chamber or a pre-chamber of the combustion chamber. Due to the comparatively wide angle of vision of the commercially available, known kinds of endoscopes, and the practically free choice of location for the observation bore, the window, or the end of the endoscope may end approximately level with, or somewhat recessed from, the interior wall of the combustion chamber.

It should be noted that the window may also be part of the endoscope, and that the optical pickup or recording by means of an endoscope-type image recording unit to be inserted into the engine, is an essential characteristic of the invention.

By suitable combination or synchronisation of the image recording unit 4 with other, timed measurement values, e.g., cylinder pressure, cylinder temperature, etc., a more detailed knowledge of the combustion process or engine behaviour may be obtained. The use of a device as described by the present invention will allow for the first time the recording of images during operation of the engine over prolonged periods of time.

The two endoscopes 2, 6, or a larger number of endoscopes, may be inserted into the main combustion chamber and/or into the pre-chamber (if existing). The observation bores 24, 24' may be normal to or inclined with respect to the interior wall of the combustion chamber 25 and may be located almost arbitrarily. The number of bores and endoscopes used also is arbitrary, although two would be the preferred number. Endoscope or image recording unit devices are simply means for obtaining an optical image suitable for recording.

The diameter of an endoscope is 5 mm approximately, for a length of 300 mm. Endoscopes usually have a fixed focus and a depth of field from 1 mm to infinity.

The image transmission device 3, 9 consists of articulated members and is provided with snap joints or other joints which are self-aligning relative to the optical axis. Therefore the camera need not be adjusted accurately.

As an adapter for camera 4 which may take 22,000 pictures per second, for instance, a beam splitter 10 may be provided, which will combine the images arriving from the various endoscopes, or direct them to corresponding sections of film. Pictures usually are taken vertically and in the direction of fuel injection, or in the pre-chamber and the main chamber, or from different angles in the main combustion chamber.

Prior to taking a film the engine to be observed is provided with steel windows which are inserted into the observation bores. After the engine has been allowed to warm up it is stopped, and the steel windows are replaced by the transparent windows, and the endoscope(s) is (are) introduced. For adjustment of the endoscopes the combustion chamber may be illuminated by a cold light which may be supplied through an observation bore by means of optical fibres, for instance. The optical image transmission device is attached to the endoscope and the camera, and the endoscope is connected to the coolant pipes; the optical fibres are replaced by a flash unit.

Then the engine is started once again and maintained in an operational state of constant thermal conditions, upon which the camera is put into operation.

When camera 4 is started the control unit 17 receives a signal in order to synchronise illumination of the combustion chamber 25, or of the fuel injection, with the pictures taken; at the same time the digital recording of other data measured is initiated, which also proceeds synchronously.

What is claimed is:

1. The combination of an internal combustion engine which defines a combustion chamber and a bore which communicates with said combustion chamber, said bore leading into said combustion chamber at a mouth, said mouth having a certain inner diameter, and an observing device located in said bore for observing the processes taking place in said combustion chamber during operation thereof, said observing device including (1) an insert sleeve which extends along said bore to a point near the mouth thereof, (2) a window tube for image transmission which is made of a heat-resistant material and which extends within said insert sleeve so as to leave an annular recess therebetween, said window tube having an inner diameter and including a first end which faces said combustion chamber and a second end which faces away from said combustion chamber, said window tube also including a disc-shaped end portion which closes the first end thereof and having an outer diameter which is less than the inner diameter of said bore, (3) adhesive means located in said annular recess to fixedly connect said window tube in said insert sleeve, (4) an optical pickup device which is positionable within said window tube, said optical pickup device including a cylindrical portion which has a free end which is movably located within said window tube, said cylindrical portion having an outer diameter which is less than the inner diameter of said window tube, and (5) a support sleeve which extends along said bore and around the cylindrical portion of said optical pickup device, said support sleeve having an outer diameter which is less than the inner diameter of said window tube, thus leaving a first annular gap between the support sleeve and the window tube therearound and a second annular gap between the support sleeve and the insert sleeve therearound, the first annular gap between the support sleeve and the window tube preventing dissipation of heat.

2. The combination as defined in claim 1, including means for supplying cooling liquid to the second annular gap between the support sleeve and the insert sleeve.

3. The combination as defined in claim 2, including an adapter sleeve which extends along said bore to the mouth thereof, said adapter sleeve having an inner diameter at the mouth of said bore which is larger than the outer diameter of said window tube, wherein said adapter sleeve includes inner threads along a portion of its length, and wherein said insert sleeve includes outer threads along a portion of its length which are cooperable with the inner threads of said adapter sleeve to allow said insert sleeve to be axially moved along said bore.

4. The combination as defined in claim 3, wherein said insert sleeve includes an inwardly-extending portion along its length, the second end of said window tube abutting against said inwardly-extending portion.

5. The combination as defined in claim 4, including an O-ring extending inwardly of said inwardly-extending portion, said O-ring contacting said support sleeve.

6. The combination as defined in claim 1, wherein said optical pickup device comprises an endoscope.

7. The combination as defined in claim 1, wherein said window tube has an imaginary axis line therethrough, and wherein said disc-shaped end portion closing the first end thereof is flat and is perpendicularly oriented relative to said imaginary axis line.

* * * * *